United States Patent [19]

Colby et al.

[11] Patent Number: 5,318,357
[45] Date of Patent: Jun. 7, 1994

[54] EXTRUDER INJECTION APPARATUS

[75] Inventors: Paul N. Colby, New Castle, Pa.;
Bradley P. Smith, Youngstown;
Shawn P. Bodnar, East Palestine, both of Ohio

[73] Assignee: Spirex Corporation, Youngstown, Ohio

[21] Appl. No.: 899,347

[22] Filed: Jun. 16, 1992

[51] Int. Cl.$^5$ .......................... B01F 7/08; B29B 7/42
[52] U.S. Cl. .................... 366/081; 366/90; 366/319; 366/322; 425/208
[58] Field of Search .............. 425/204, 208, 209; 100/145; 366/69, 76, 77, 79, 81-85, 88-90, 96-99, 318, 319, 322-324; 198/662, 664, 665, 669, 676

[56] References Cited

U.S. PATENT DOCUMENTS

| | | | |
|---|---|---|---|
| 2,335,819 | 11/1943 | Upton | 198/664 X |
| 3,006,029 | 10/1961 | Saxton | 366/90 |
| 3,564,651 | 2/1971 | Covington, Jr. et al. | 366/343 |
| 3,652,064 | 3/1972 | Lehnen et al. | 366/90 X |
| 3,687,423 | 8/1972 | Koch et al. | 425/208 |
| 3,945,622 | 3/1976 | Sokolow | 366/82 |
| 3,986,709 | 10/1976 | Vermeulen | 366/90 |
| 4,092,015 | 5/1978 | Koch | 425/208 X |
| 4,215,978 | 8/1980 | Takayama et al. | 425/208 X |
| 4,639,143 | 1/1987 | Frankland, Jr. | 366/90 X |
| 4,752,136 | 6/1988 | Colby | 366/323 X |
| 4,779,989 | 10/1988 | Barr | 425/208 X |
| 4,840,492 | 6/1989 | Nakamura | 366/81 |
| 4,846,659 | 7/1989 | Nakamura | 425/208 |
| 4,944,906 | 7/1990 | Colby et al. | |
| 4,953,279 | 9/1990 | Colby | |
| 4,963,033 | 10/1990 | Huber et al. | 366/81 |
| 5,018,917 | 5/1991 | Colby | |
| 5,033,860 | 7/1991 | Nakamura | 366/90 X |
| 5,035,509 | 7/1991 | Kruder | 425/208 X |
| 5,071,256 | 12/1991 | Smith et al. | 366/89 |

FOREIGN PATENT DOCUMENTS

| | | | |
|---|---|---|---|
| 2908497 | 9/1980 | Fed. Rep. of Germany | 425/208 |
| 5546304 | 11/1980 | Japan | 425/208 |

OTHER PUBLICATIONS

Screw Design Efficiency in Color Distributive Mixing with ABS Resins by Barbara Furches and John Bozzelli (Article reprinted from ANTEC '87).
Implementation of Advanced Screw Design for Injection Molding. How to Improve Your Productivity and Profits: A Case History by J. Bozzelli and B. Larin (Reprinted from ANTEC '90).
Advanced Screw Design Applied To Semi-Crystalline Thermoplastic Resins by M. P. Sepe (Reprinted from ANTEC '91).
Screw and Barrel Technology-SPIREX by Paul N. Colby (1985).

*Primary Examiner*—Harvey C. Hornsby
*Assistant Examiner*—Charles Cooley
*Attorney, Agent, or Firm*—Fay, Sharpe, Beall, Fagan, Minnich & McKee

[57] ABSTRACT

A screw for use in an plasticating injection apparatus includes a plurality of interrupted primary flights. An outer surface of a primary valley is formed by the primary flights and features a plurality of plateaus. The plateaus span adjacent sections of the primary flights and define shallow levels between deeper levels of the primary valleys. This depth differential contributes to a turbulent mixing action which, along with the primary and secondary valleys, contributes to improve mixing action within a metering section of the screw. The primary flights are interrupted by secondary valleys which are of opposite hand to the primary valleys.

17 Claims, 4 Drawing Sheets

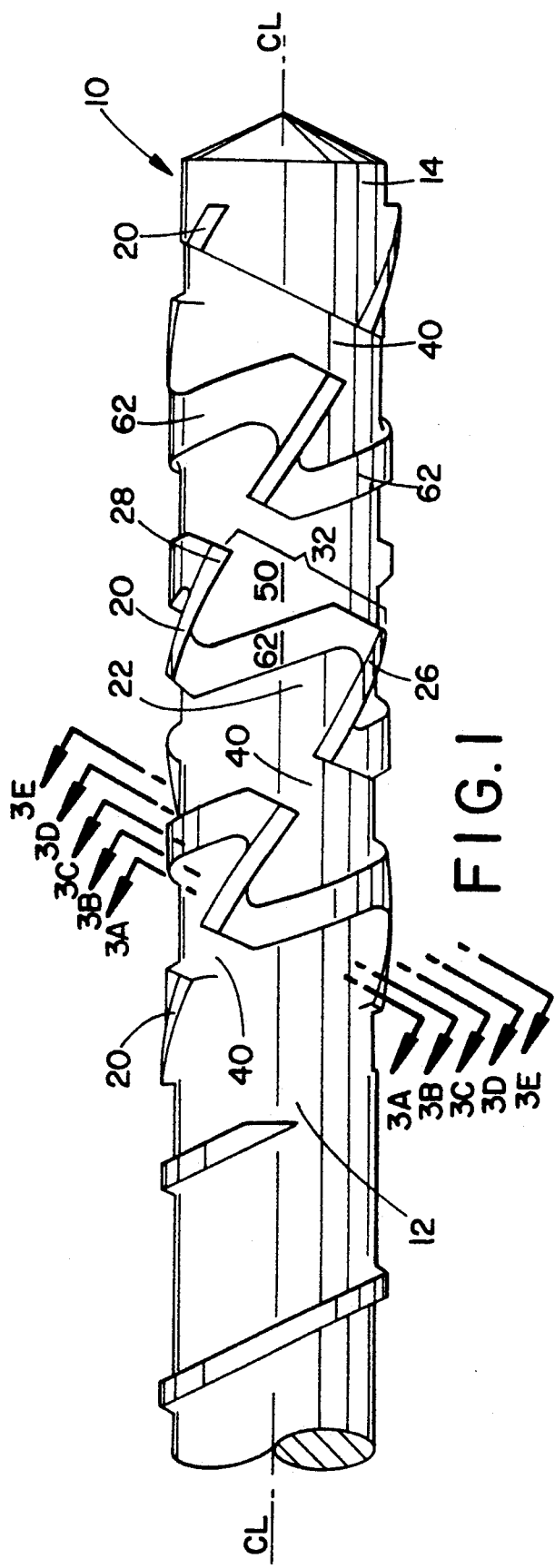
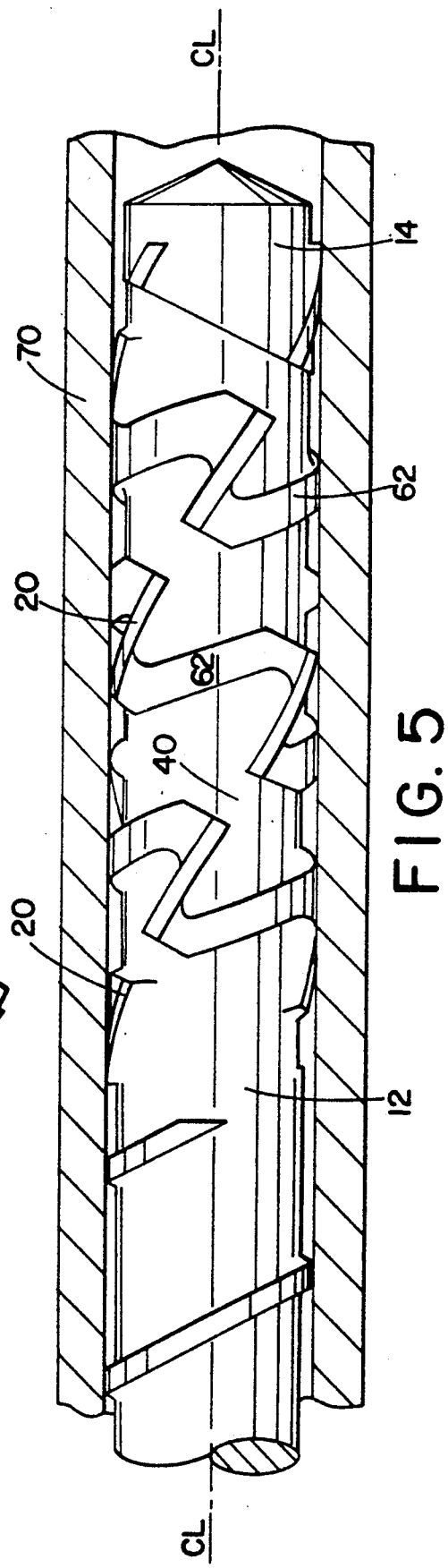

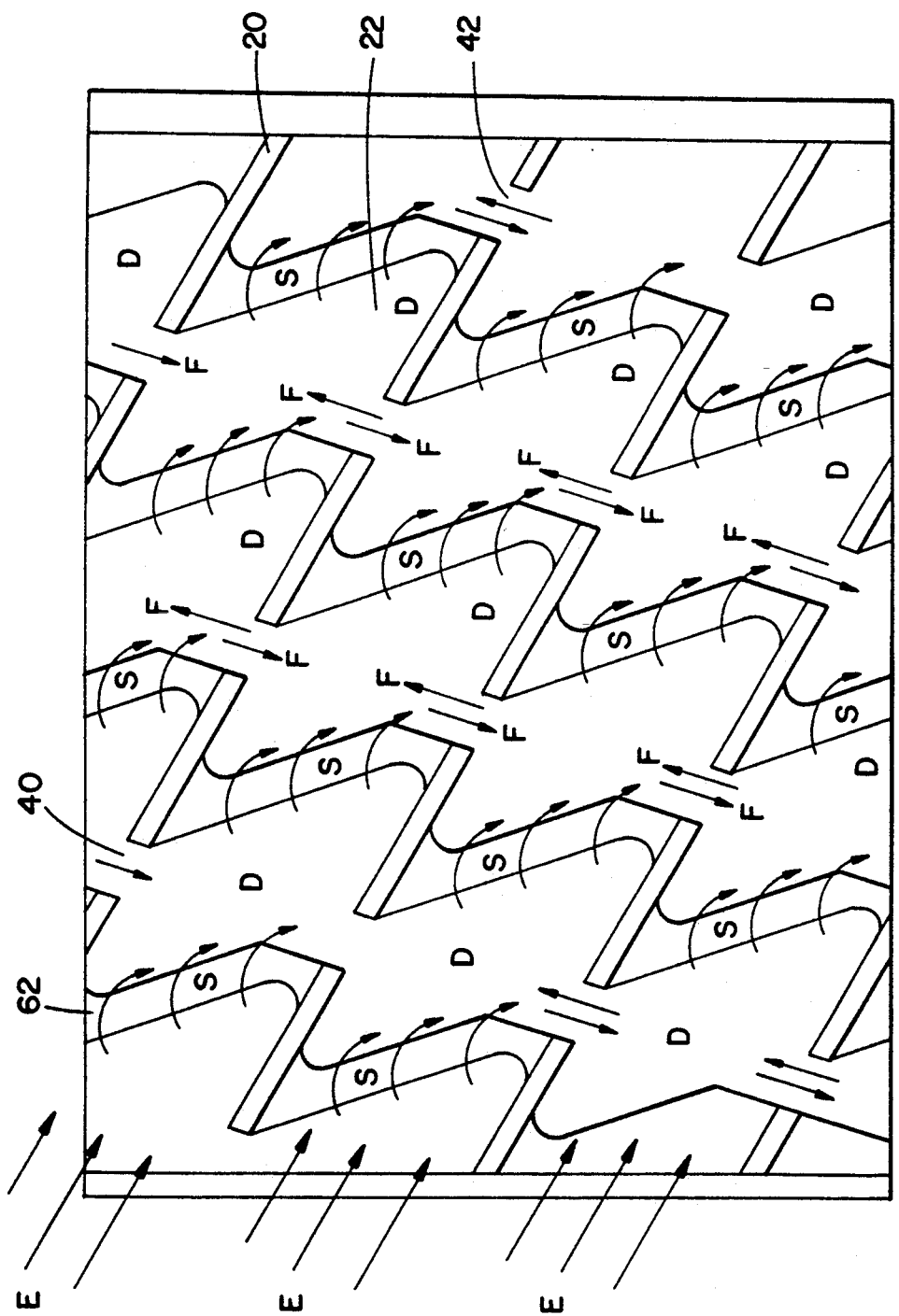

EXTRUDER INJECTION APPARATUS

BACKGROUND OF THE INVENTION

1. Field of Invention

This invention relates to the field of extruders and injection machines utilizing a rotatable screw within a heated barrel, and more specifically to a screw structure which improves mixing of the injection material while that material is within the barrel.

2. Description of the Related Art

Extruders and injection molding machines are well known. One of the common problems in the use of such a machine is the differences in the material properties of the material due to temperature differentials between points close to the inner surface of the barrel wall and points farther away. Because the barrel is heated, a temperature differential commonly exists across the material between these points. It is preferable that this temperature differential be minimized in order to avoid over heating the injection material or otherwise damaging its properties. One way to minimize such differential is to mix the resinous material while it is in the barrel.

Another common problem concerns molding of products utilizing resinous materials of different colors. When resinous materials of two or more colors are to be molded, any incomplete mixing of such resinous materials could mar the appearance of the finished molded product.

For these and other reasons, better mixing of resinous materials within extruder barrels has been desired within the industry.

Various methods of providing such mixing are known in the art. For example, in U.S. Pat. No. 3,006,029 to Saxton, an extruder mixing screw is disclosed having primary channels and minor channels. In addition, U.S. Pat. No. 5,035,509 to Kruder discloses a screw with a zig zag barrier for mixing within the mixing section of the screw. U.S. Pat. No. 5,071,256 to Smith et al. discloses a screw with barrier near the outlet end of the screw. Finally, U.S. Pat. No. 4,752,136 to Colby discloses a plasticating apparatus and rotating screw having at least two paths of different depths near an outlet end of the screw.

Although some of these screws are effective for their purpose, further improvements are desirable.

The present invention contemplates a new and improved plasticating apparatus and method which overcomes the foregoing difficulties and others while providing better and more advantageous overall results.

SUMMARY OF THE INVENTION

In accordance with the present invention, a new and improved method and apparatus for plasticating a resinous, injection material is disclosed.

More particularly, in accordance with the invention, a screw according to the invention comprises an inlet end and an outlet end. A plurality of interrupted primary flights extend between the inlet end and the outlet end. The primary flights are helically-shaped and have a primary pitch and a primary hand. The primary flights create primary valleys between corresponding points on adjacent primary flights. The primary valleys have an outer surface. A plurality of secondary valleys are also helically-shaped and also extend between the inlet end and outlet end of the screw. The secondary valleys are created by the interruptions in the primary flights. The secondary valleys also have an outer surface. The hand of the primary flights is opposite the hand of the secondary valleys. A plurality of plateaus span adjacent sections of the interrupted primary flights and define shallow levels between deeper levels of the primary valleys. This depth differential creates a shearing and tumbling, mixing action of the resin as the screw rotates. This mixing action improves the homogeneity of the resinous material. Further, the secondary valleys, running at a different pitch and at a different hand than the primary flights, create opportunities for resinous material of one extruder section of the screw to mix with resinous material of a different extruder section as the material travels along the screw from the inlet end to the outlet end.

One advantage of the present invention is the provision of a new and improved screw to be used with an associated plasticating apparatus.

Another advantage of the invention is the provision of secondary valleys running at a different pitch and at an opposite hand to primary flights along the screw. The secondary valleys provide opportunities for better mixing, and allowing resin from one section to mix with resin from another section. This is commonly referred to a "distributive mixing."

A still further advantage of the invention is the provision of relatively shallow plateaus in the primary valleys of the screw. The plateaus contribute a shearing mixing flow. As the material moves from the plateaus into the deeper valleys, there is a tumbling, turbulent, mixing flow which further mixes the injection material. This type of mixing is often referred to as "dispersive mixing." The present invention has benefits of both distributive and dispersive mixing.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 1 is a side elevational view of an extruder screw according to the invention;

FIG. 4 is a schematic view of the screw similar to FIG. 2 and showing the path of resinous injection material passing through the screw; and, FIG. 5 is a side elevational view of an extruder screw within the barrel of a plasticating apparatus.

DESCRIPTION OF THE PREFERRED EMBODIMENT

Figure 2:
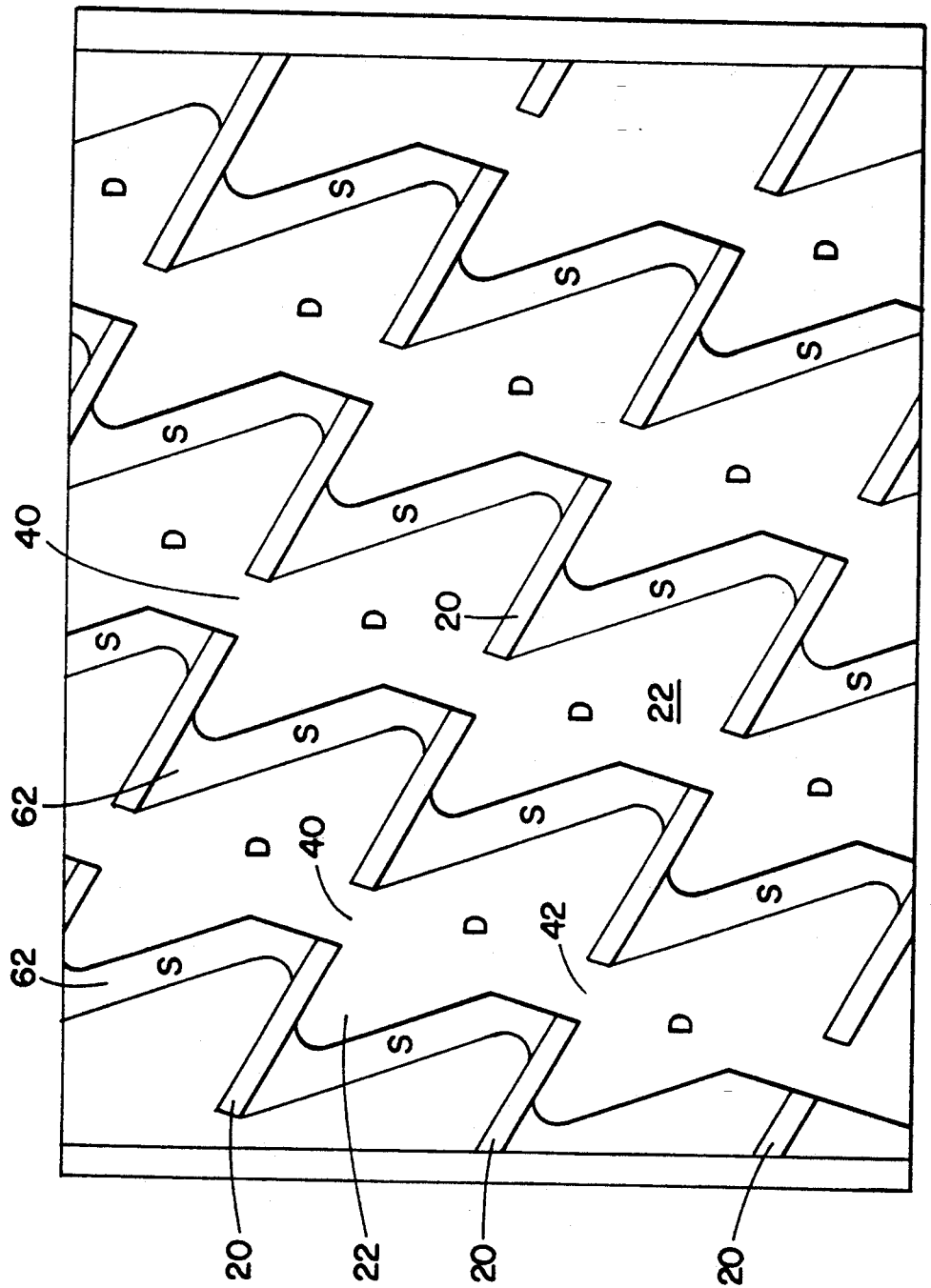
FIG. 2 is a schematic representation of the extruder screw of FIG. 1 as if it had been unwrapped and laid flat.
Figure 3A:
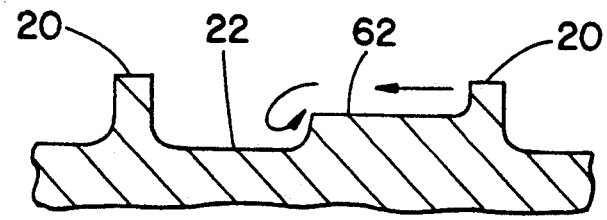
FIGS. 3A–3E are cross-sectional views of a screw according to the invention, the views taken along lines 3A, 3B, 3C, 3D, and 3E of FIG. 1.
Figure 3B:
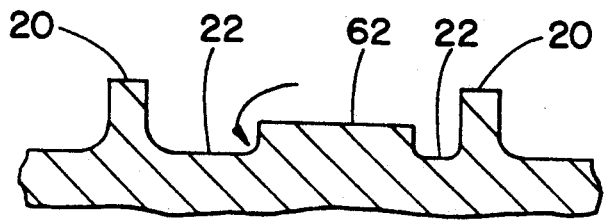
Figure 3C:
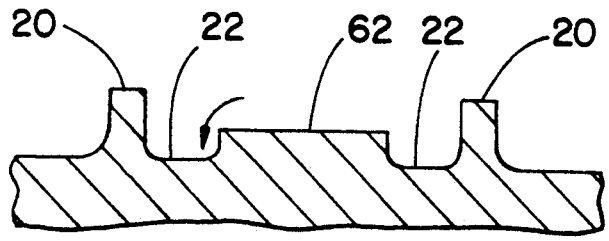
Figure 3D:
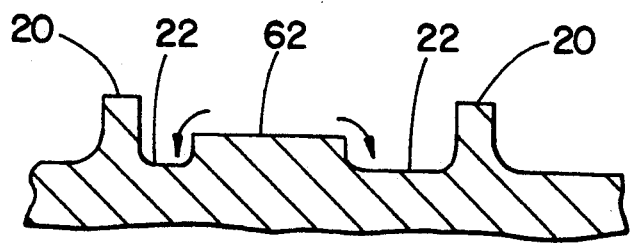
Figure 3E:
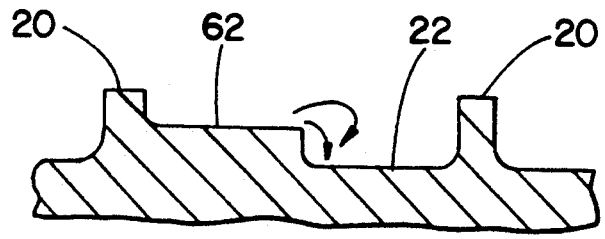

Referring now to the drawings wherein the showings are for purposes of illustrating a preferred embodiment of the invention only and not for purposes of limiting the same, FIG. 1 shows an extruder screw 10 according to the invention. FIG. 5 shows the extruder screw 10 of FIG. 1 within a barrel 70 of a plasticating apparatus.

The screw 10 has an inlet end 12 and an outlet end 14. The segment of the screw 10 shown in FIG. 1 is the metering section of the screw. A typical injection or extrusion plasticating screw will have a feed section, a transition section and a metering section in series.

A plurality of interrupted primary flights 20 extend from the inlet end 12 to the outlet end 14. The primary flights 20 are helically arranged about the circumference of the screw 10. The primary flights 20 have a pitch equal to the forward distance traversed in one full revolution of the flights. The primary flights 20 create primary valleys 22 between corresponding points 26, 28 on adjacent primary flights 20. The term "corresponding" should be understood as points on opposite sides of the valley, on the peaks of the adjacent flights, which are the minimum distance apart. In other words, each primary valley is defined by a width which is the distance between points 26 and 28. The distance marked 32 in FIG. 1 indicates the width of each of the primary valleys 22.

A plurality of secondary valleys 40 also extend helically about the screw 10 from the inlet end 12 to the outlet end 14. The secondary valleys 40 are defined by the interruptions in the primary flights. In the preferred embodiment, the hand of the secondary valleys 40 is opposite to the hand of the primary flights 20. In an alternate embodiment, the hand of the secondary valleys 40 is the same as the hand of the primary flights 20 but at a different pitch.

The function of the secondary valleys 40 is to create more mixing of the injection material within the barrel of the associated plasticating apparatus by creating a series of cross pathways for the resinous material to traverse. Because the resinous material can travel from the inlet end 12 of the screw 10 to the outlet 14 by the primary valleys 22 or the secondary valleys 40, segments of the resinous material which are at a first temperature can be mixed with portions of the injection material which are at different temperatures, viscosities, colors, etc., thereby contributing to a more uniform injection material.

With reference to FIGS. 1 and 3A–3E, the primary valleys 22 are shown between adjacent portions of the primary flights 20.

A plateau 62 between the primary flights defines a relatively shallow depth in the valley. Movement of material over the plateau 62 provides a shearing mixing action contributing to the benefits of this device. The turbulent, tumbling, mixing action of resinous material due to depth differential in the primary valleys 22 created by the plateau 62 increases the homogeneity of the injection material. For example, with reference to FIGS. 3A–3E, the five cross-sectional views shown in FIGS. 3A–3E illustrate the changing configuration of the outer surface of primary valleys 22 experienced by the molten injection material as it flows through the primary valleys 22. The tumbling, mixing action can be envisioned by the reader as the molten resin is turned over upon itself repeatedly as it progresses down the screw 10. The widths of the valley sections as shown in FIGS. 3A–3E are changing, but are doing so in a way so as to keep the sum of volumes of material in the valleys approximately equal.

With reference to FIG. 2, a schematic illustration of the outer surface of screw 10 is shown. To assist the reader, the representation of FIG. 2 is similar to what would be obtained if the screw 10 of FIG. 1 was slit at one edge along its axis and unwrapped and laid flat on a table. The primary flights 20, the primary valleys 22, the secondary valleys 40, and the plateaus 62 are indicated. In FIG. 2, as well as in FIG. 4, the letters "S" and "D" refer to "shallow" and "deep" respectively, denoting depths in the screw surface.

It is evident from FIGS. 3a–3e that the plateau 62 has an outer surface that is located approximately halfway between the bottom surface of the primary valley 22 and the outer edge of each primary flight 20. This enables the plastic material which enters an axially upstream portion of the primary valley to flow over the plateau in a shearing tumbling flow and enter an axially downstream portion of the primary valley as shown in FIG. 4 of the drawings.

With reference to FIG. 4, the schematic illustration of FIG. 2 is further amplified by the addition of arrows. The arrows indicate the path of molten resinous injection material as it passes through the primary valleys 22 and the secondary valleys 40.

As will be evident from FIG. 4 the screw of this invention provides for a plurality of mixing actions as the resinous material moves from the inlet to the outlet thereof.

The arrows E of FIG. 4 generally designate portions of material that are fed through extruder sections of the apparatus——such extruder sections being defined by interrupted primary flights 20, primary valleys 22 and plateaus 62. Three (3) extruder sections or three (3) starts of material are shown in FIG. 4. Although the preferred embodiment has three flights, any number of flights more than two will work.

The arrows F generally designate portions of material that are fed through a distributive section of the screw being defined by the interrupted primary flights 20 and secondary valleys 40.

Since the hand of the primary flights is, in the preferred embodiment, opposite to that of the secondary valleys, mixing is enhanced as a portion of the material designated F in FIG. 4 may, for a short time, move upstream or downstream and, is shifted from one extruder section of the screw to another. Such movement is influenced by the screw's revolutions per minute (RPM) and by the pressure within the barrel of the extruder. As a result there is a cross-mixing of material as portions of resin in an extruder section are caused to be moved to another extruder section.

The invention has been described with reference to a preferred embodiment. Obviously, modifications and alterations will occur to others upon a reading and understanding of this specification. It is intended to include all such modifications and alterations insofar as they come within the scope of the appended claims or of the equivalence thereof.

Having thus described the invention, it is now claimed:

1. A screw suitable for use with an associated plasticating apparatus, said screw comprising:
   an inlet end and an outlet end;
   a plurality of interrupted primary flights, said primary flights being disposed between said inlet and outlet ends of said screw, said primary flights being helically-shaped and having an outer edge, said primary flights having a primary flight pitch and a primary flight hand;
   a plurality of primary valleys, said primary valleys being formed between two adjacent sections of said primary flights, said primary valleys having a bottom surface and being helically shaped;

a plurality of secondary valleys, said secondary valleys being disposed between said inlet and outlet ends of said screw, said secondary valleys being helically-shaped and having a secondary valley pitch and a secondary valley hand; and, a plateau extending across one of said primary valleys and interconnecting two adjacent sections of said interrupted primary flights, wherein said plateau has an upper surface located approximately halfway between said primary valley bottom surface and said primary flight outer edge so that an associated plastic material which enters an axially upstream portion of said primary valley will flow over said plateau in a shearing tumbling flow and enter an axially downstream portion of said primary valley.

2. The screw of claim 1 wherein the hand of said primary flights is opposite the hand of said second valleys.

3. The screw of claim 1 further comprising a second plateau interconnecting two adjacent sections of said interrupted primary flights wherein said second plateau is spaced from said first plateau.

4. A screw suitable for use with an associated plasticating apparatus, said screw comprising:
an inlet end and an outlet end;
a first interrupted flight, said first flight being disposed between said inlet and outlet ends of said screw, said first flight being helically-shaped and having an outer edge;
a second interrupted flight, said second flight being disposed between said inlet and outlet ends of said screw in a spaced manner from said first flight, said second flight being helically-shaped and having an outer edge;
a plurality of primary valleys, said primary valleys being formed between adjacent sections of said first and second flights, said primary valleys having a bottom surface; and
a plateau spanning a primary valley between said first and second flights, said plateau having an upper surface located approximately halfway between a bottom surface of said primary valley and an outer edge of said first and second flights such that an associated plastic material which enters an axially upstream portion of said primary valley will flow over said plateau in a shearing tumbling flow and enter an axially downstream portion of said primary valley, wherein said screw further comprises a metering section which is located between said inlet and outlet ends of said screw and wherein said first and second flights are located in said metering section of said screw.

5. The screw of claim 4 further comprising a plurality of secondary valleys which are disposed between said inlet and outlet ends of said screw, said secondary valleys being helically-shaped and having a secondary valley pitch and a secondary valley hand.

6. The screw of claim 5 wherein said first and second flights have an identical hand and wherein said secondary valley hand is opposite said hand of said first and second flights.

7. The screw of claim 4 wherein said first flight has a first flight pitch and a first flight hand.

8. The screw of claim 7 wherein said second flight has a second flight pitch and a second flight hand.

9. The screw of claim 8 wherein said pitch and hand of said second flight is identical to said pitch and hand of said first flight.

10. A plasticating apparatus including a rotatable screw, said apparatus comprising:
a barrel, said barrel having an inner wall, said barrel also having inlet and outlet opening said inlet opening of said barrel being suitable for receiving an associated resinous injection material and said outlet opening being suitable for discharging the associated plasticized resinous injection material after processing in said apparatus; and,
a rotatable screw, said screw having an inlet and an outlet end, said inlet end of said screw being near said inlet opening of said barrel and said outlet end of said screw being near said outlet opening of said barrel, said screw rotating within said barrel and further comprising:
a plurality of interrupted primary flights, said primary flights being helically-shaped and having an outer edge, said outer edge of said primary flights being located closely within and cooperating with said inner wall of said barrel;
a plurality of primary valleys, said primary valleys being formed between two adjacent sections of said interrupted primary flights, said associated resinous injection material being advanced from said inlet opening to said outlet between adjacent primary flights by rotation of said screw within said barrel, said primary valleys having a bottom surface; and,
a plurality of plateaus extending across said primary valleys and interconnecting adjacent sections of said interrupted primary flights, wherein said plateaus each have an upper surface located approximately halfway between said primary valley bottom surface and said outer edge of said primary flights so that the associated resinous material which enters an axially upstream portion of said primary valleys will flow over said plateaus and enter an axially downstream portion of said primary valleys.

11. The plasticating apparatus claim 10 wherein said primary valleys define a relatively deep depth in said screw and said plateaus define a relatively shallow depth.

12. The plasticating apparatus claim of 10 further comprising a plurality of secondary valleys, said secondary valleys being helically-shaped and having an identical secondary valley hand.

13. The plasticating apparatus claim of 12 wherein each of said primary flights has an identical hand which is opposite said secondary valley hand.

14. A screw suitable for use with an associated plasticating apparatus for resinous material, the screw comprising:
a first flight extending along a length of the screw in a helical pattern, said first flight having an outer surface which forms an outside diameter of the screw;
a second flight extending along said length of the screw in a manner spaced from said first flight, said second flight having an outer surface;
a primary valley formed between adjacent sections of said first and second flights, said primary valley forming a root diameter of the screw;
a means for dispersive mixing of the resinous material, said means for dispersive mixing comprising a plateau spanning said primary valley and interconnecting two adjacent sections of said first and second flights, each plateau having an outer surface with a diameter that is approximately halfway between said root diameter and said outside diameter so that a plastic material which enters an axially upstream portion of said primary valley will flow over said plateau and enter an axially downstream portion of said primary valley; and, a means for distributive mixing of the resinous material, said means for distributive mixing comprising a helically extending secondary valley interrupting said first and second flights.

15. The screw of claim 14 wherein said first and second flights have an identical hand and wherein said secondary valley has a hand that is opposite to said hand of said first and second flights.

16. The screw of claim 14 wherein said second flight has a pitch which is identical to a pitch of said first flight.

17. The screw of claim 14 wherein said second flight outer surface is located at said outside diameter of the screw.

* * * * *